United States Patent
Wang et al.

(10) Patent No.: US 6,924,870 B1
(45) Date of Patent: Aug. 2, 2005

(54) LIQUID CRYSTAL ON SILICON DIFFRACTIVE LIGHT VALVE

(75) Inventors: Bin Wang, Kent, OH (US); Philip Bos, Hudson, OH (US); David B. Chung, Cupertino, CA (US)

(73) Assignee: Kent State University, Kent, OH (US)

( * ) Notice: Subject to any disclaimer, the term of this patent is extended or adjusted under 35 U.S.C. 154(b) by 2 days.

(21) Appl. No.: 10/425,480

(22) Filed: Apr. 29, 2003

Related U.S. Application Data (60) Provisional application No. 60/377,292, filed on Apr. 30, 2002.

(51) Int. Cl.[7] .............................................. G02F 1/1334
(52) U.S. Cl. ............................. 349/156; 349/88; 349/86
(58) Field of Search ......................... 349/156, 93, 86, 349/201, 88, 123, 128, 130, 132

(56) References Cited

U.S. PATENT DOCUMENTS

| | | | |
|---|---|---|---|
| 4,729,640 A | | 3/1988 | Sakata |
| 4,850,681 A | * | 7/1989 | Yamanobe et al. ......... 349/201 |
| 5,473,450 A | * | 12/1995 | Yamada et al. ............... 349/84 |
| 5,880,801 A | * | 3/1999 | Scherer et al. .............. 349/124 |
| 6,175,399 B1 | * | 1/2001 | Mitsui et al. ............... 349/113 |

* cited by examiner

Primary Examiner—Tarifur R. Chowdhury
Assistant Examiner—Thoi V. Duong
(74) Attorney, Agent, or Firm—Fay, Sharpe, Fagan, Minnich & McKee, LLP (57) ABSTRACT

A liquid crystal diffractive light valve includes: a pair of opposed substrates wherein one of the substrates is a silicon wafer with associated electronics. The other substrate has an electrode layer facing the silicon substrate. And a ultraviolet curable composite material is disposed between the substrates which is then phase separated to form polymer walls having liquid crystal directors fixed therein regardless of application of an electric field across the electrode layers, and wherein pixel regions are formed between the polymer walls. The pixel regions have liquid crystal directors which are movable when an electric field is applied across the electrode layers. Application of an electric field allows for generation of phase differences between the wall and pixel regions to allow for Liquid Crystal on Silicon devices to be used as diffractive light valves.

12 Claims, 12 Drawing Sheets

V=0.0 VOLTS

FIG-12A

V=5.0 VOLTS

LIQUID CRYSTAL ON SILICON DIFFRACTIVE LIGHT VALVE

CROSS-REFERENCE TO RELATED APPLICATION

This application claims the benefit of U.S. Provisional Application No. 60/377,292 filed on Apr. 30, 2002.

GOVERNMENT RIGHTS

The United States Government has a paid-up license in this invention and may have the right in limited circumstances to require the patent owner to license others on reasonable terms as provided for by grant DMR89-20147 awarded by the National Science Foundation.

TECHNICAL FIELD

The present invention is generally related to liquid crystal devices. Specifically, the present invention is directed to a liquid crystal on silicon diffractive light valve. Specifically, the present invention is directed to a liquid crystal on silicon device which utilizes polymer walls between pixels to yield high diffraction efficiency.

BACKGROUND ART

Liquid crystal on silicon (LCoS) devices are of great interest. They provide high resolution, high brightness and high contrast and are utilized in high-definition television, near-eye viewing devices, and projectors. Most of these devices utilize liquid crystal polarization rotation electro-optical effects to modulate the output of light. A drawback of these devices is that their pixel density cannot be very high because of the need for the devices to avoid the diffraction effect and fringe field effect. Yet another limitation on pixel density is that the light transmissions through these devices become lower because of the significant increase in the corresponding of non-active areas. These non-active areas are also referred to as the inter pixel regions. In other words, the regions between the pixel boundaries, although minimal, reduce the active area for light transmission.

The concept of a rectangular diffraction grating filled with liquid crystal has been reported in U.S. Pat. No. 4,729,640 by Sakata et al. Although effective in its stated purpose, the grating of Sakata does not provide optimum light transmission. Other groups have used high resolution LCDs to display holograms with 30 µm width pixels, providing extremely limited holograph image quality. However, it is unsure whether this device can be easily reproduced. Indeed, with a 60 µm size, over 350 orders are transmitted through a grating, each a half degree apart. The $0^{th}$ order could still be modulated with such a device, but baffling of the stray light in non-zero orders is believed to be a difficult task.

Figure 1A:
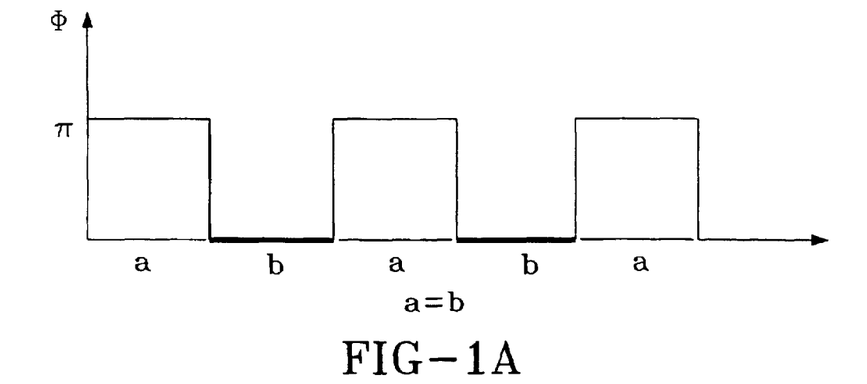
FIGS. 1A and B are waveforms of a desired phase profile for a high efficiency diffraction grating and a typical phase profile.
Figure 1B:
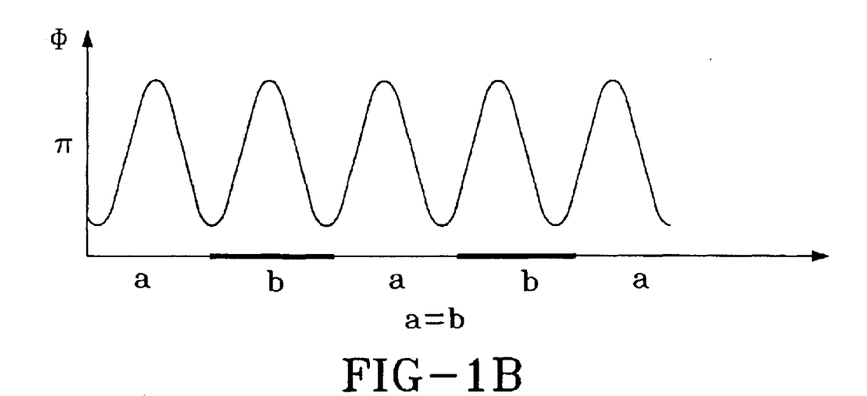

The phase profile for an ideal high efficiency diffraction grating is shown in FIG. 1A. It will be appreciated that the ideal waveform is sharp and well delineated between two phase states to provide a square-like phase profile. However, the phase profile for a patterned electric field liquid crystal grating typically looks like sinusoid wave as shown in FIG. 1B. It will be appreciated that such a wave form does not provide a high-diffraction efficiency and therefore the performance characteristics of the grating are much less than desired.

Accordingly, there is a need in the art to produce a square-like phase grating to improve the high-diffraction efficiency.

SUMMARY OF THE INVENTION

Therefore, there is a need in the art for a liquid crystal on silicon diffractive light valve with a square-like phase grating.

Another object of the present invention, which shall become apparent as the detailed description proceeds, is achieved by a liquid crystal diffractive light valve comprising: a pair of opposed substrates; each having an electrode layer facing each other; and a composite material disposed between the substrates, the composite material phase separated to form polymer walls having liquid crystal directors fixed therein regardless of application of an electric field across the electrode layers, and pixel regions between the polymer walls, the pixel regions having liquid crystal directors which are movable when an electric field is applied across the electrode layers.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIGS. 12A and B are FDTD simulation snap shots of video clips for electric field distribution of the computational domain, wherein FIG. 12A shows the device with no voltage applied and wherein FIG. 12B shows the device with 5 volts applied;

FIGS. 13A and B graphical representations of all FDTD near field transformed far field diffraction patterns of the simulated liquid crystal on silicone device, wherein FIG. 13A shows the device with a voltage applied and wherein FIG. 13B shows the device with 5 volts applied;

FIGS. 16A and 16B are illustrations of liquid crystal director calculation results for a simulated pixel, wherein directors are anchored by the adjacent substrates and polymer walls, wherein the pixel width is about 6.0 $\mu$m and the cell thickness is about 5.0 $\mu$m, and wherein FIG. 16A is with 0 volts applied to the simulated pixel and FIG. 16B is with 3.0 volts applied to the simulated pixel;

BEST MODE FOR CARRYING OUT THE INVENTION

Figure 2:
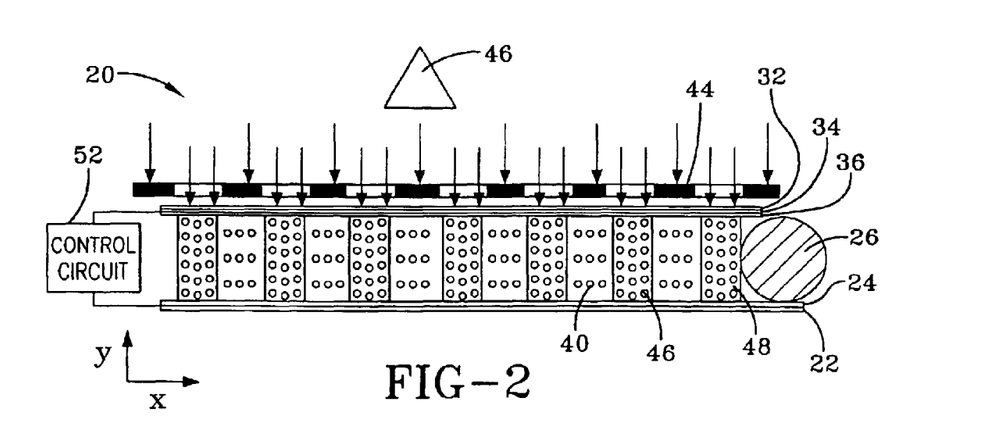
FIG. 2 is schematic diagram of an exemplary liquid crystal on silicon device made according to the teachings of the present invention.

Referring now to the drawings, and in particular to FIG. 2 it can be seen that a liquid crystal on silicon diffractive light valve device made according to the teachings of the present invention is designated generally by the numeral 20. The device 20 includes a silicon substrate 22 which simultaneously functions as a substrate and an electrode layer and includes the appropriate driving electronics to allow for control of each pixel of the light valve device 20. It will be appreciated by those skilled in the art that the silicon substrate 22 may be used in either a transmissive or reflective system and the device described herein will be referred to as a transmissive device. However, the device 20 could easily be used in a reflective system that utilizes a reflective substrate. In any event, the substrate 22 may have disposed thereon an alignment layer 24 which in the preferred embodiment is a rubbed polyimide material. Of course other types of alignment treatments may be used depending upon the liquid crystal material selected and other factors. A plurality of spacers 26 are disposed on the substrate 22 and a transparent substrate 32 is disposed opposite the substrate 22. The substrate 32 includes an electrode layer 34 which in the preferred embodiment is indium tin oxide. An alignment layer 36 may be disposed over the electrode layer 34 and is also preferably a rubbed polyimide material. The spacers 26—which may be either glass or plastic—are sized to provide the appropriate diffraction properties of the end device and the spacing between the substrates may be anywhere from 1 micron to 20 microns although other sizes may be employed as deemed appropriate. The substrate 32 may be glass, plastic or other appropriate material.

Figure 3:
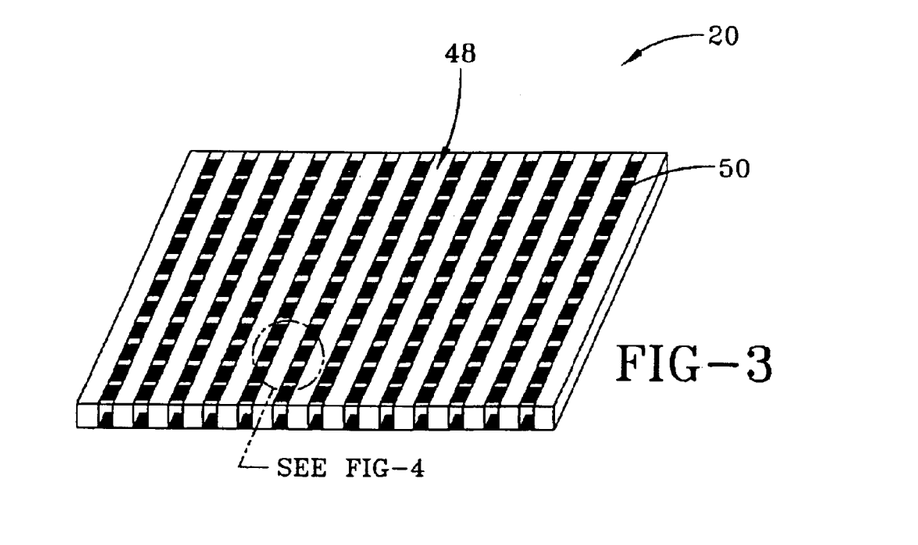
FIG. 3 is a perspective drawing of polymer walls and pixels formed between substrates, which are not shown, of the liquid crystal on silicon device.
Figure 4:
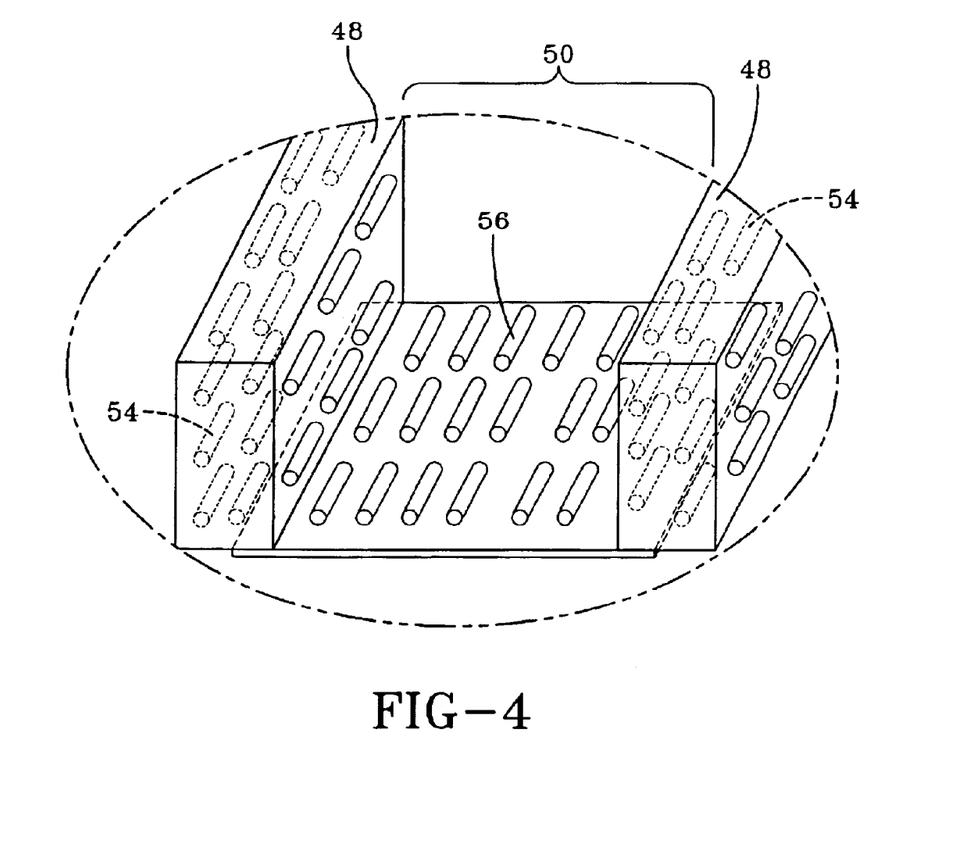
FIG. 4 is an exploded view of a pixel between polymer walls of the liquid crystal on silicon device.
Figure 5:
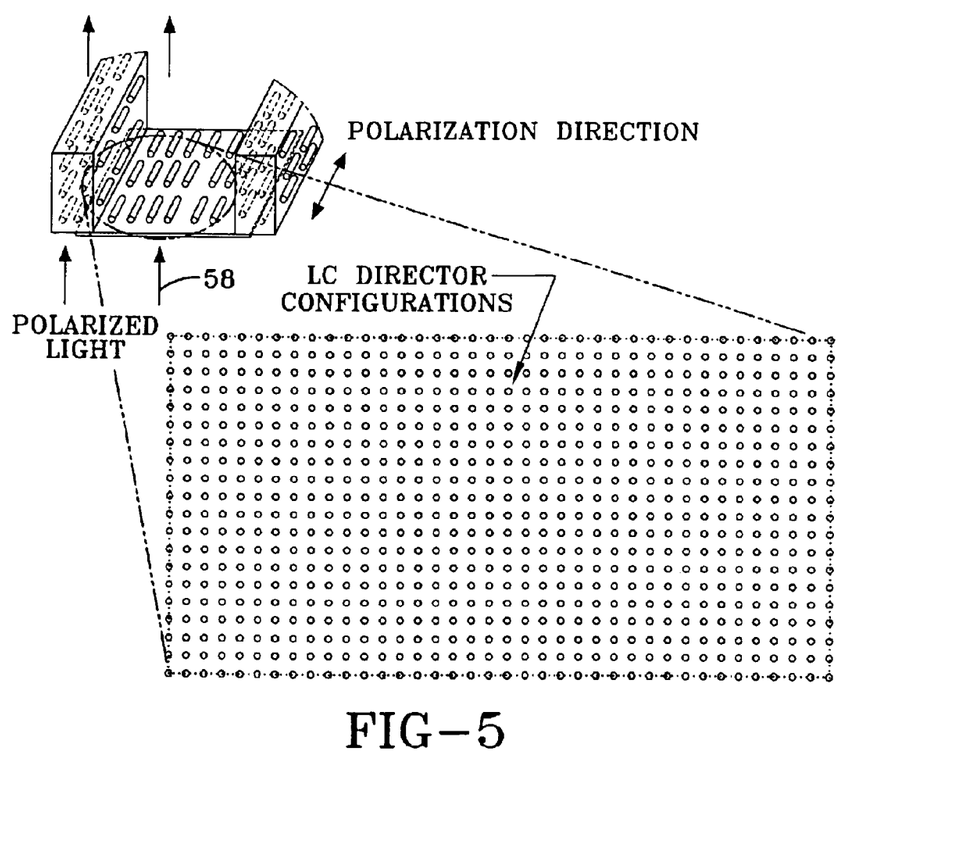
FIG. 5 is an exploded view showing the liquid crystal director configurations within a pixel when no electrical field is applied.
Figure 7:
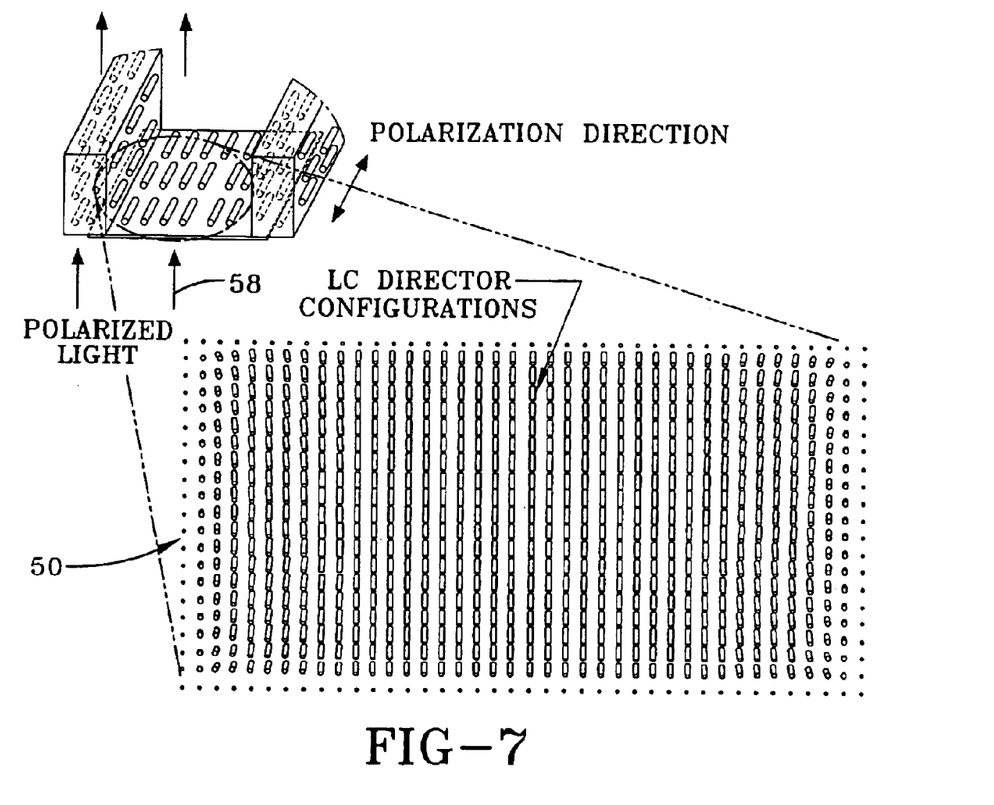
FIG. 7 is an exploded view showing the liquid crystal director configurations within a pixel when an electrical field is applied.

A composite material 38 is filled between the gap formed between substrates 22 and 32 in a manner well known in the art and is sealed appropriately. The composite material 38 includes a liquid crystal material 40 and a reactive monomer 42. In the preferred embodiment the liquid crystal material may be a material such as MLC6263-000 which has an extraordinary index of refraction value $n_e$=1.6582 and an ordinary index of refraction value of $n_o$=1.503 which results in a $\Delta$n value of 0.1552, and a positive dielectric anisotropy of 10.1. A preferred reactive liquid crystal monomer is RM82 which has a $n_e$ value of 1.656, a $n_o$ value of 1.532 and a $\Delta$n value of 0.124. This should also apply to other polymeric or monomeric materials of similar nature that possess the prerequisite UV reactive functional group in order to make the building of such "walls" feasible. Once this homogeneous mixture is thoroughly mixed and disposed between the substrates 22 and 32 an ultraviolet light mask 44 is disposed over the substrate 32 and then an ultraviolet light 46 is applied to the mask so as to form polymer walls 48 between the interior surfaces of the facing substrates 22 and 32. Accordingly, as best seen in FIG. 3, polymer walls 48 are formed between the substrates at a desired spacing therebetween along one dimension of the liquid crystal on silicon device 20. It will be appreciated by those skilled in the art that the mask 44 may be configured to generate walls which are substantially perpendicular to the polymer walls 48. Utilizing polymer walls along just one direction of the device forms a one dimensional diffractive light valve. However, by forming walls in a first direction and perpendicular walls in a second direction it will be appreciated that a two dimensional light valve could be formed utilizing the teachings of the present invention. In any event, the selection of the silicon substrate 22 allows for formation of individual pixels 50 along the lengths of liquid crystal material formed between each respective polymer wall 48. Application of a voltage to the electrode layer 34 and the substrate 22 which incorporates the appropriate electrodes is controlled by a control circuit 52 which contains the necessary hardware, software and memory for implementing a driving scheme to obtain the desired diffractive light patterns in a system utilizing the valve 20. During ultraviolet exposure, the phase separation and polymerization of the materials takes place so that polymer walls are formed in the ultraviolet exposed area, which is sometimes referred to as the inter pixel region, and the reactive liquid crystal directors are "locked" in their initial orientation and will not respond to application of an externally applied electrical field. But in the ultraviolet non-exposure area, also referred to as the pixel regions 50, the liquid crystal directors can be reoriented by application of an external electric field. Choosing liquid crystal and reactive liquid crystal monomer having substantially similar extraordinary refractive indexes, wherein both being equal would be ideal and where no electric fields are applied, incident light that is linearly polarized along the z-direction and that passes through the device will not be diffracted because of the index matching between the liquid crystal in the polymer walls and in the pixel regions. However, when an electric field is applied, light passing through the device will see the device's refractive index difference and the polarized light will be diffracted. Polymerization of the active monomer 42 results in the locking of the liquid crystal directors as best seen in FIGS. 4, 5 and 7, wherein the directors retained within the polymer walls 48 retain the orientation imparted by the alignment layers 24 and 36. It will also be appreciated that the liquid crystal directors that are not captured in the polymer walls are free to orient themselves with the alignment layers when no voltage is applied. And when a voltage is applied by the control circuit 52, the liquid crystal directors orient themselves in a corresponding manner.

Figure 6:
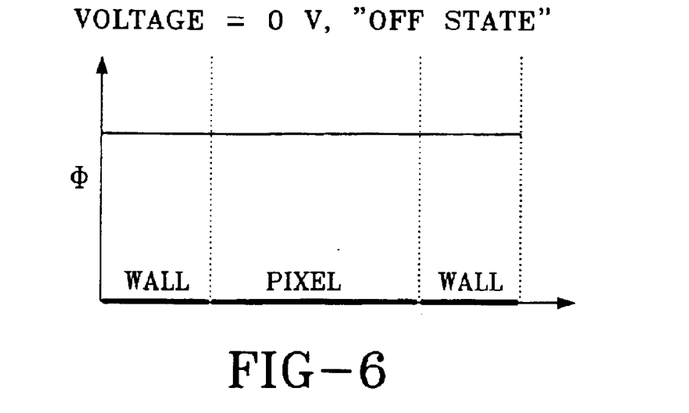
FIG. 6 is a phase diagram of an exemplary pixel when no voltage is applied to the pixel.

Accordingly, as best seen in FIG. 5, application of a polarized light, which is aligned with the alignment direction of the alignment layers and which is typically in the direction of the polymer walls 48, will be transmitted through the polymer walls and the pixels in the same phase when the appropriate voltage is applied. In other words, the phase difference of the light traveling through both the walls and the pixels, as best seen in FIG. 6, will be substantially the same.

Figure 8:
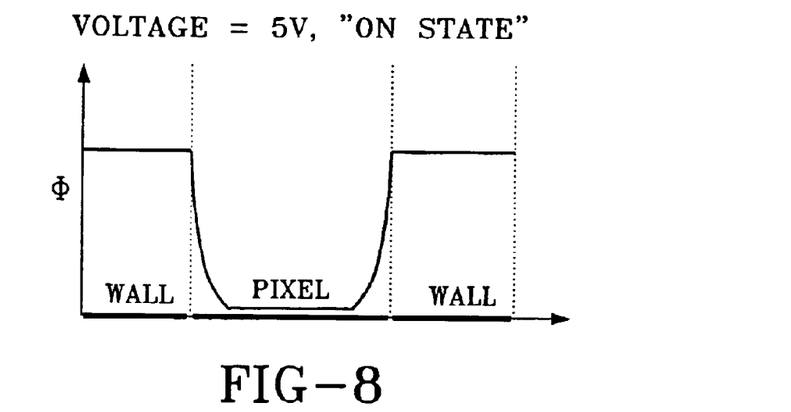
FIG. 8 is a phase diagram of an exemplary pixel when a voltage is applied to the pixel.

Referring now to FIGS. 7 and 8. it can be seen that when a second voltage value is applied to the device, the liquid crystal directors between the polymer walls 48, i.e., those in the pixel area 50, reorient themselves such that the phase of the light transmitted therethrough is different than the light transmitted through the polymer walls. In other words, the light transmitted through the pixel area is minimally delayed, if at all, while the polarized light transmitted through the polymer walls is delayed by an amount which is dependent upon the thickness of the cell and the light propagating properties of the polymer and the liquid crystal material selected. It will be appreciated that the profile shown in FIG. 8 closely resembles the desired phase profile shown in FIG. 1A. The lack of sharpness of light propagation between the wall and the pixel is primarily attributable to the anchoring affect of the polymer on the liquid crystal directors immediately adjacent thereto. As a further example, the phase state of light passing through the polymer walls 48 may be identified as P1, and the phase state of the polarized light passing through the pixels 50 may be identified as P2. Application of a voltage to the valve changes the phase state of P2, but not P1. For the best operation, it is desired that application of a first voltage value V1 will cause P2 to equal P1, and that application of a second voltage value V2 will cause P2 to be a half-wave different from P1. In other words P2=(P1±nλ)/2, wherein n is an odd integer and λ is the wavelength of the considered light. For a transmissive device it is understood that the phase state of the light would be developed by a single pass through the pixel and the polymer wall material, however for a reflective device the desired phase would be developed through two passes through the material. Therefore, the thickness of the reflective device would be approximately half that considered for a transmissive device.

Figure 9A:
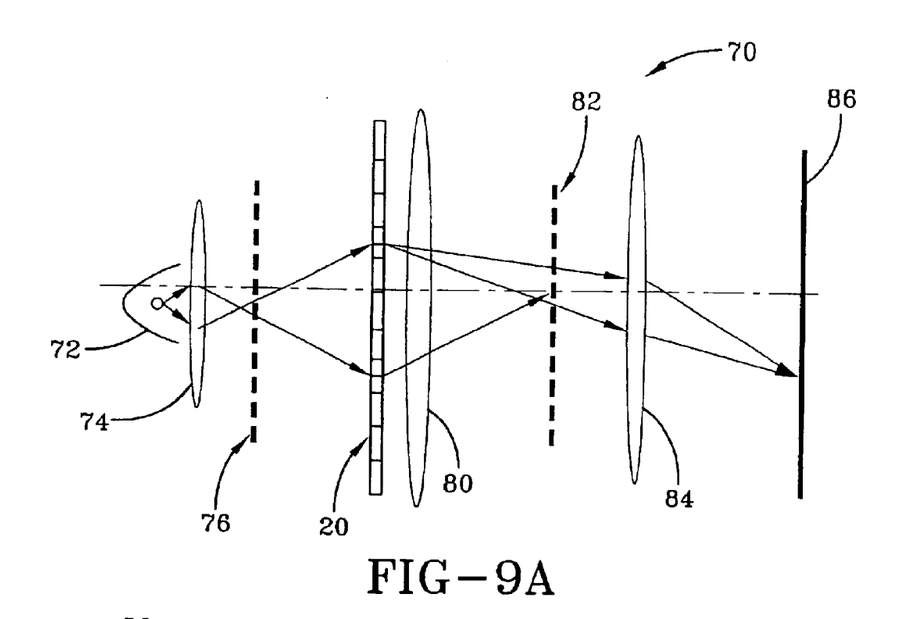
FIG. 9A is a transmissive Schlieren optical system utilizing the liquid crystal diffractive light valve made according to the present invention and FIG. 9B is a Reflective Schlieren Optical System.
Figure 9B:
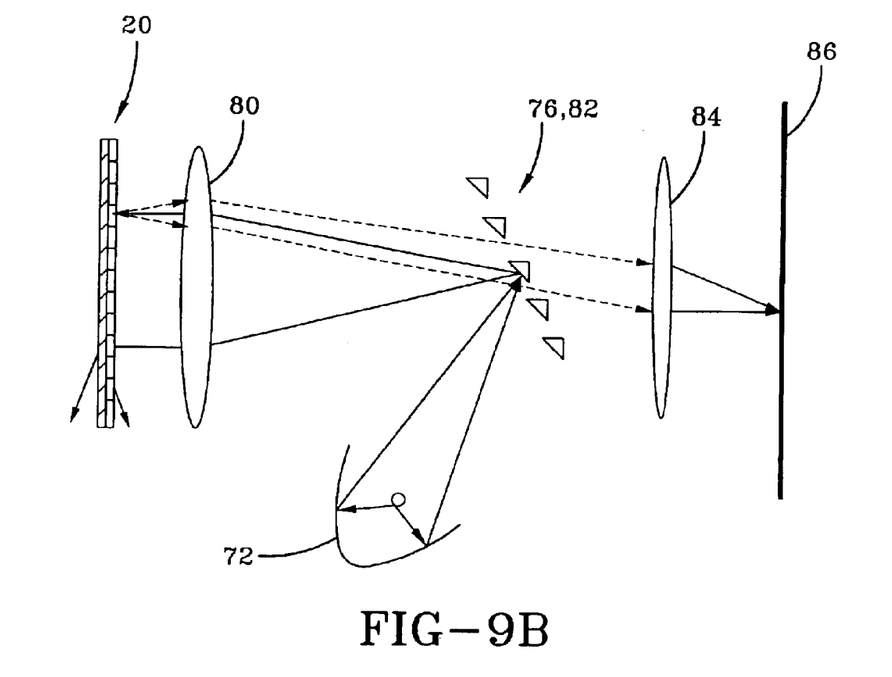

Referring now to FIG. 9A it can be seen that utilization of the device 20 in an exemplary optical system is designated generally by the numeral 70. The system 70 is a Schlieren optical system which is used to modulate the light amplitude or intensity on a projection screen. The system 70 includes an arc lamp 72 which transmits a light through a condenser 74 for the purpose of polarizing the light which is then transmitted through a plurality of input bars 76 such that light passing through the input bars impinges upon the device 20. After passing through the device 20 as controlled by the on/off states of the pixels 50, the light is projected through a Schlieren lens 80 which further transmits the light through output bars 82. The light is then passed through a projection lens 84 from where the light is then passed onto the display screen 86. A reflective system is shown in FIG. 9B and operates in a manner similar to that shown in FIG. 9A except that the silicon substrate functions as a mirrored device and only one set of louver bars 76/82 are needed.

In the above system, if a dark field projection condition is used, which means the device is in a nondiffraction state, the light passing through the device will be blocked by the output bars 82 and the projection image will be dark. However, when a device is in a diffraction state, light passing through the device will also pass through the output bars and as such the projection image on the screen 86 will be bright.

It will be appreciated that many parameters such as the width of the polymer walls 48, the size of the liquid crystal pixel 50, the thickness of the cell and the physical parameters of the liquid crystal need to be optimized to achieve the rectangular-like liquid crystal phase profile as shown in FIG. 8. These optimizations can be completed by utilizing a computer simulation.

A modified director calculation may be utilized to simulate the liquid crystal director configurations within a polymer wall. Utilizing the materials noted previously—MLC6263-000 and RM82—an exemplary device can be simulated.

In order to optimize the cell thickness at an applied voltage of 5 volts, which is believed to be at the higher operating end of the voltage for LCoS devices, the liquid crystal director fields are calculated for different cell spacing until the cell spacing yields phase differences between polymer walls and the liquid crystal pixels close to π or odd multiple images of π. Utilizing this configuration it is believed that a cell thickness for a preferred example is 6.2 μm, and the width of pixel size is believed to be about 6 μm.

Figure 10A:
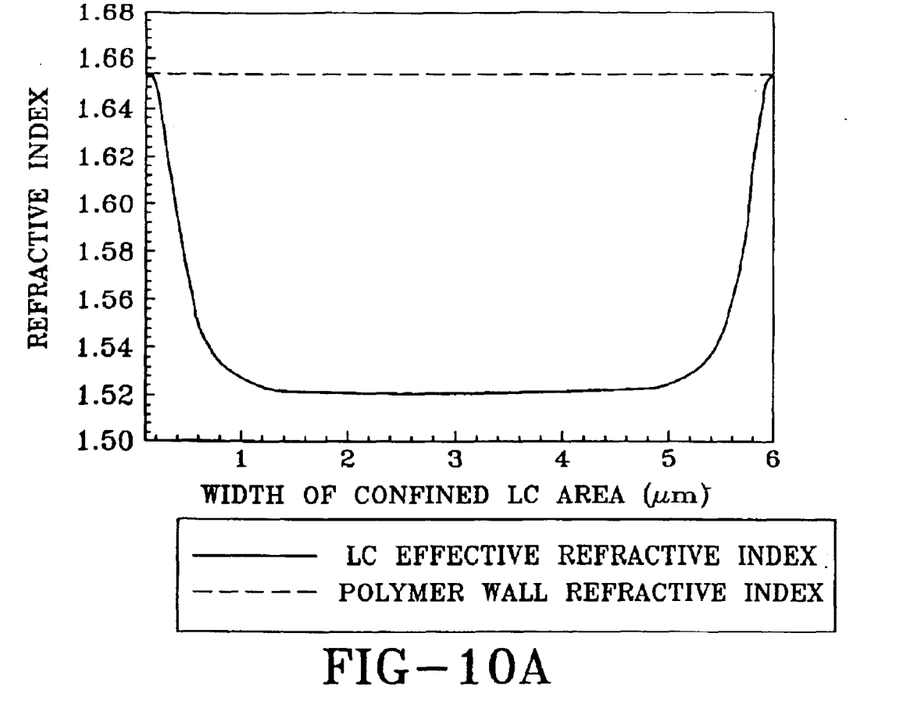
FIGS. 10A and B are graphical representations of the refractive index and phase difference, respectively, of a simulated liquid crystal on silicone device made according to the present invention.
Figure 10B:
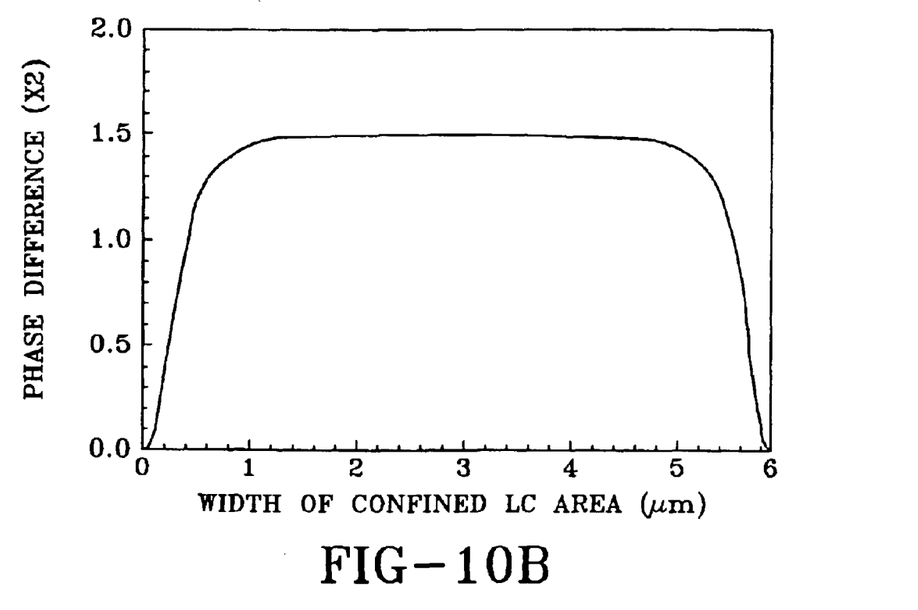

FIG. 10A shows the liquid crystal effective refractive index distribution corresponding to liquid crystal director configurations of FIG. 7, wherein the dotted line shows the effective refractive index of the polymer wall 48. FIG. 10B illustrates the phase difference between the polymer walls and the liquid crystal pixel regions of FIG. 7 of the simulated device.

With an optimized cell thickness of 6.2 μm, a three π phase difference between the polymer wall and the pixel region is achieved at the center part of the pixel. Considering the polymer wall boundaries effect, the width of the polymer wall would be desirably a bit smaller than the width of the liquid crystal pixel instead of equal, which is the ideal phase profile case shown in FIG. 1A.

For the purpose of further simulations, a 5 μm dimension for the width of the polymer wall 48 is selected. In order to accurately simulate the light propagating through the device 20, a two dimensional optical calculation needs to be implemented. Here a finite-difference time-domain (FDTD) method may be employed. This method is a numerical approach to directly solve Maxwell's time-independent curl equations in a two-dimensional or a three-dimensional domain, wherein no other assumptions are involved. For sourceless homogenous anisotropic media, the Maxwell equations can be written as follows:

$$-\frac{\partial \vec{H}(r)}{\partial t} = \mu_0^{-1}(r) \bullet [\nabla \times \vec{E}(r)] \quad (2)$$

$$\frac{\partial \vec{E}(r)}{\partial t} = \varepsilon^{-1}(r) \bullet [\nabla \times \vec{H}(r)] \quad (1)$$

Where $\in^{-1}(r)$ is the inverse of the spatially varying dielectric tensor. A standard explicit central difference scheme is then applied. The discretization technique utilized provides fourth-order accuracy to approximate the first order derivative in space and second-order accuracy to approximate the first order of derivative in time.

Figure 11:
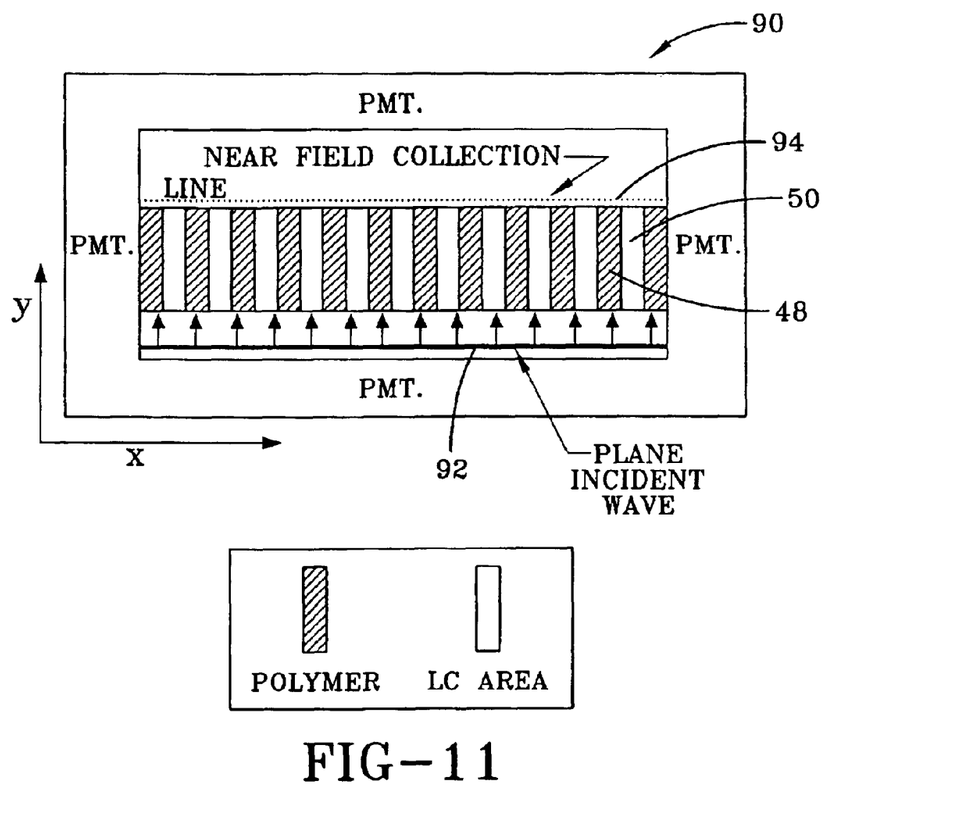
FIG. 11 is a layout of a finite-difference time-domain (FDTD) grid employed in a two-dimensional computer simulation of a device made according to the present invention.

The FDTD configuration is shown in FIG. 11 wherein the Perfectly Matched Layer (PML) technique was used for terminating the grid. In particular, the perfectly matched layer is designated generally by the numeral 90 and the liquid crystal device 20 is disposed therein with the polymer walls 48 and the liquid crystal material 50 disposed therebetween. An incident wave 92 is applied to the device 20 and a near field collection line designated generally by the numeral 94 is disposed on the other side of the device 20. Accordingly, location of the incident wave is applied and the simulation program simulates the propagating properties of the device for a specific moment in time and then progresses to simulate the light propagating properties of the theoretical device at a subsequent moment in time. In particular, the FTDT calculation domain is illuminated by a Z-direction polarized plane wave from the bottom of the device wherein the light wave has an equal amplitude. The wavelength A for the simulation is 550 nm, with a grid spacing of λ/20. By mapping the calculated director field to the FDTD calculation domain, the FDTD near field calculation results can be obtained for 0 and 5 volts respectively.

Figure 12A:
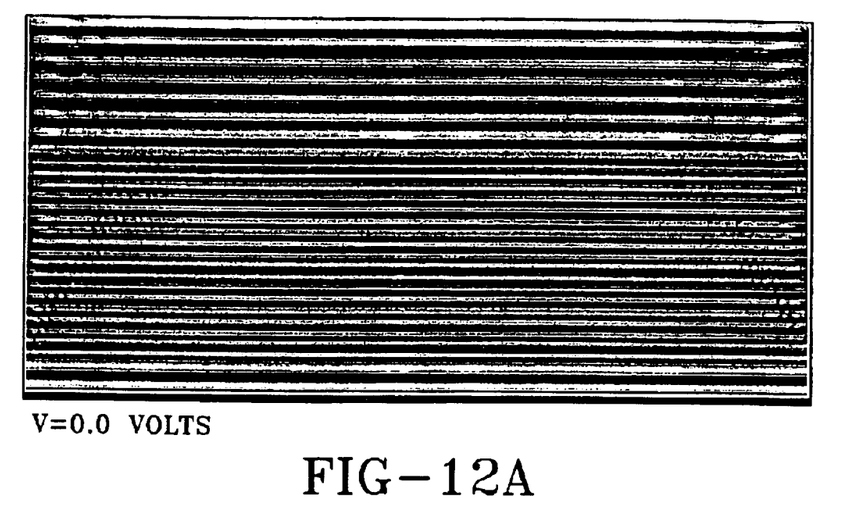
Figure 12B:
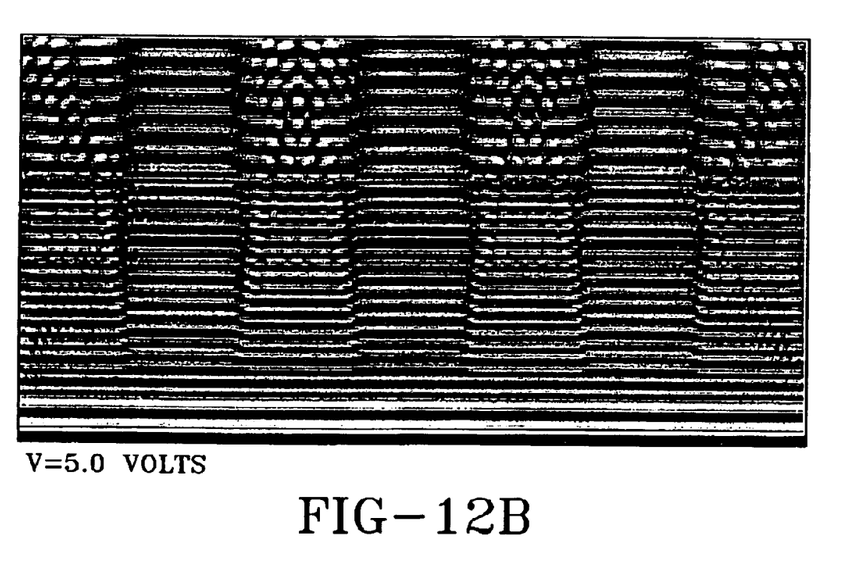
Figure 13A:
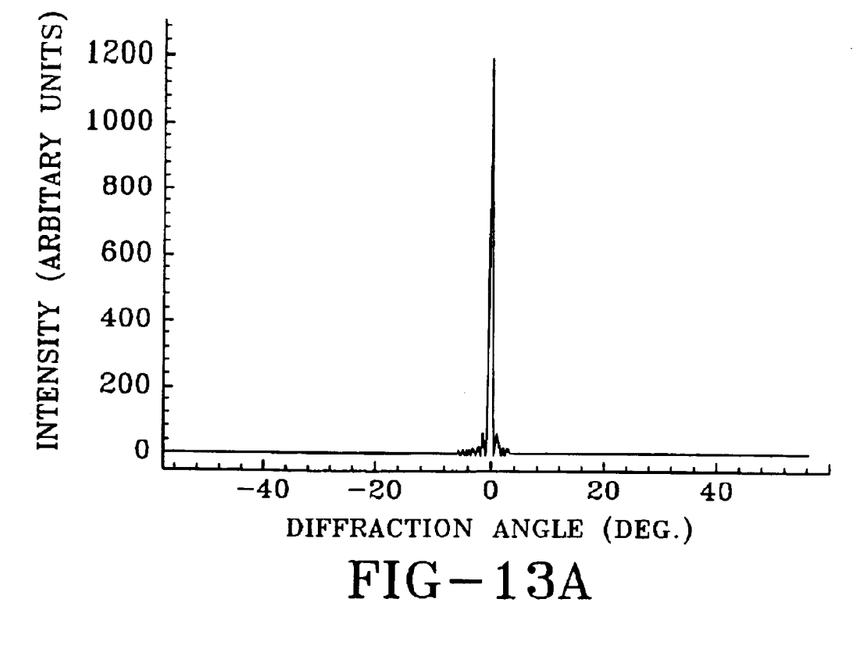
Figure 13B:
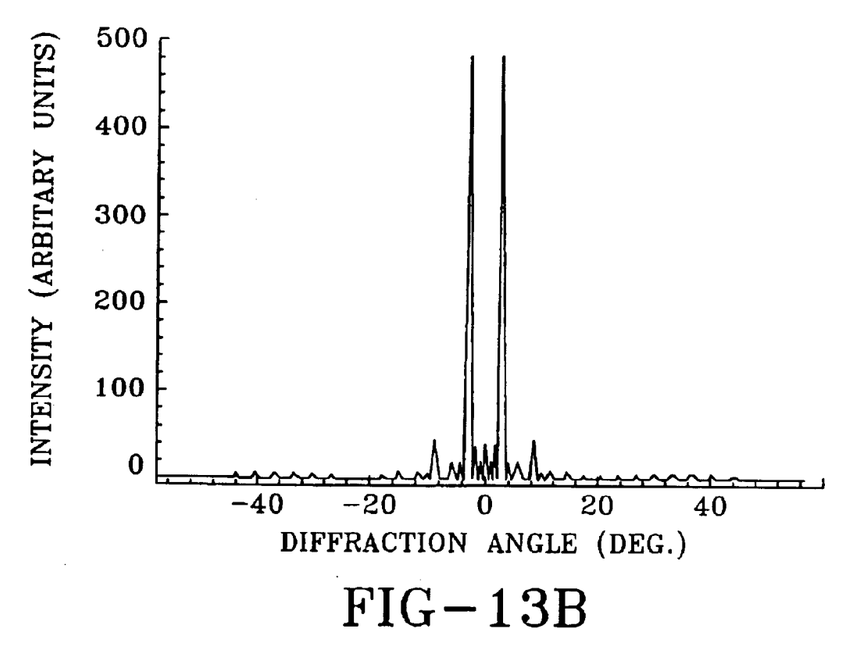

FIGS. 12A and 12B illustrate a picture of near electric field distribution of voltages 0 volts and 5 volts respectively. In particular, FIG. 12A shows the simulated device with 0 volts applied and FIG. 12B shows the simulated device with 5 volts applied. By collecting the calculated near field results and transforming to far field, the farfield amplitude or intensity distribution can be obtained. These are illustrated in FIGS. 13A and 13B which show the far field light intensity distribution at non-diffraction (FIG. 13A) and diffraction (FIG. 13B) states. By integrating the odd order of the diffraction peaks of FIG. 13B, the brightness of the device can be obtained.

Figure 14:
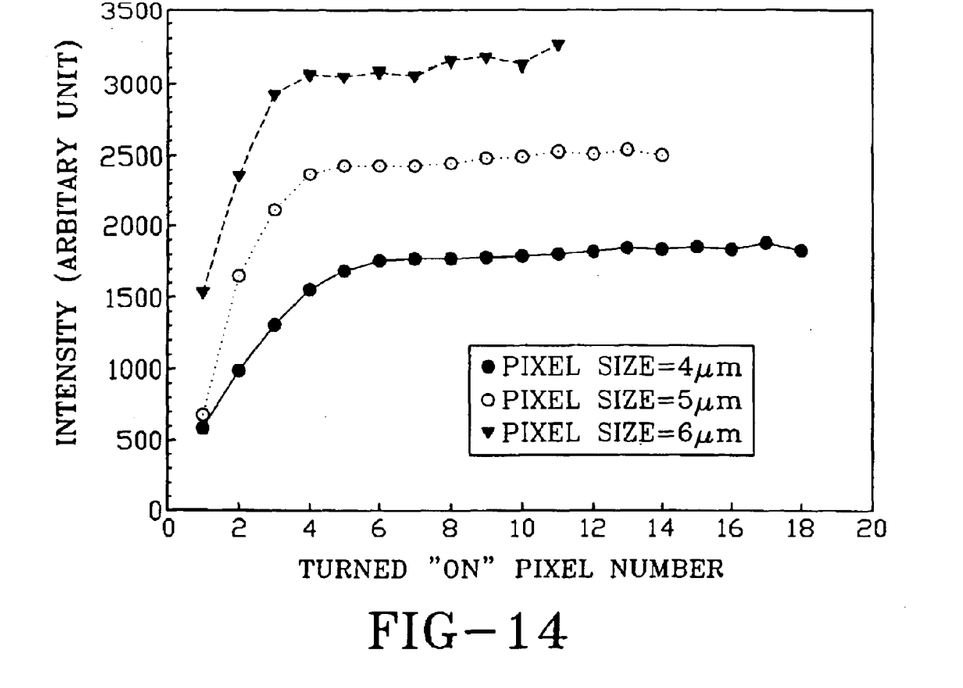
FIG. 14 is a graphical representation of the intensity of a simulated liquid crystal on silicone device utilizing various pixel sizes.

FIG. 14 shows the phase profile at fixed cell thicknesses of 6.2 μm and a voltage of 5.0 volts, and pixel sizes of 4.0, 5.0 and 6.0 μm respectively. A calculated brightness is a function of the number of "on" pixels and the different pixel sizes.

Figure 15:
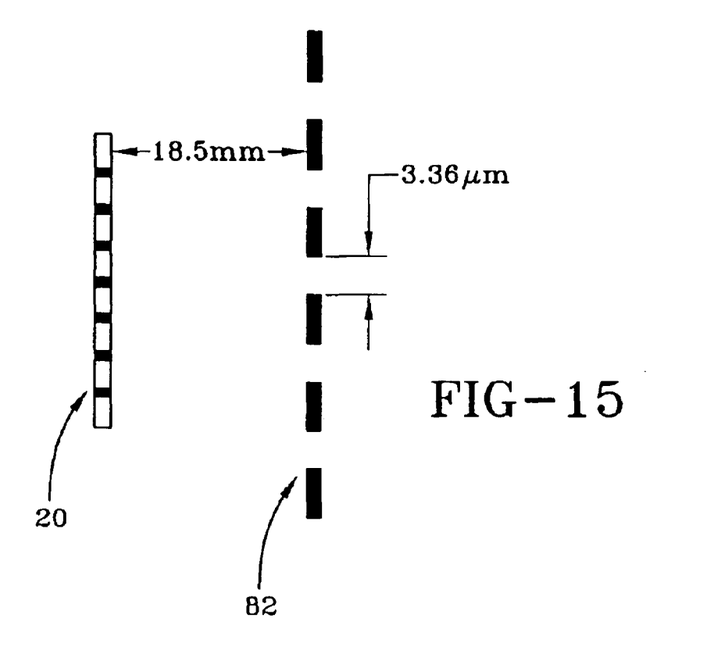
FIG. 15 are exemplary geometric dimensions used in determining the intensity values for the graphical representations shown in FIG. 14.

FIG. 15 shows the normalized brightness which is brightness/on pixel number and non-fraction or zero (on) pixel intensity normalized to 1.0 as a function of the (on) pixel number for different pixel sizes. For corresponding pixel sizes of 4.0, 5.0 and 6.0, the polymer wall sizes used for the calculation are 3.0, 4.0 and 5.0 μm, respectively. Since the thickness of 6.2 μm is not optimized for a pixel size of 4 μm, its diffraction efficiency is lower than pixel sizes of 5.0 and 6.0 μm. It will be further appreciated by those skilled in the art that the calculation results shown in FIG. 14 are based upon the geometric dimensions shown in FIGS. 15. It can be seen that the simulation utilizes 18.5 mm spacing between the device 20 and the bars 82. And the bars 82 are separated from one another by about 3.36 μm. It will be appreciated that these dimensions may not be optimized for an actual Schlieren optical systems, but are believed to be accurate for simulated results.

Since a low driving voltage is one of the desired characteristics of devices 20 it is believed that the present simulated construction will ultimately lower the cost of the final product.

Figure 16A:
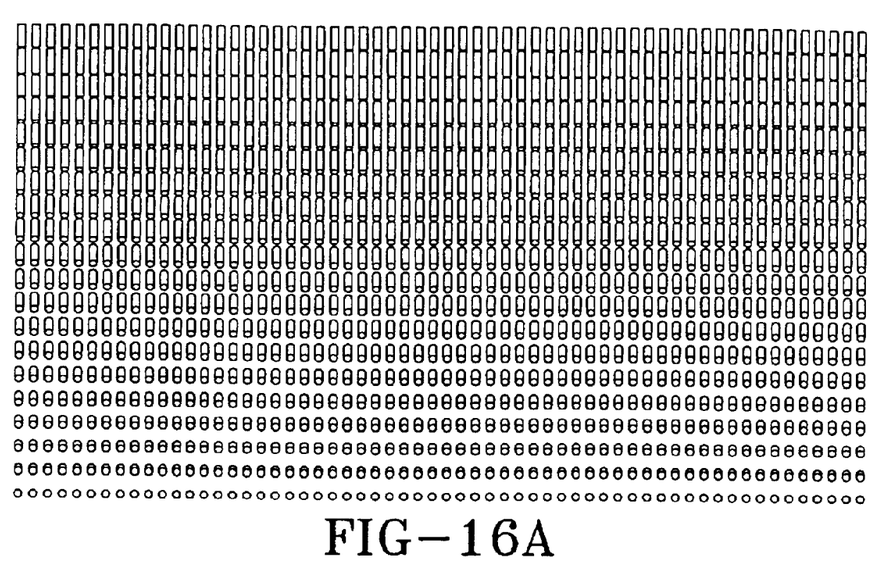
Figure 16B:
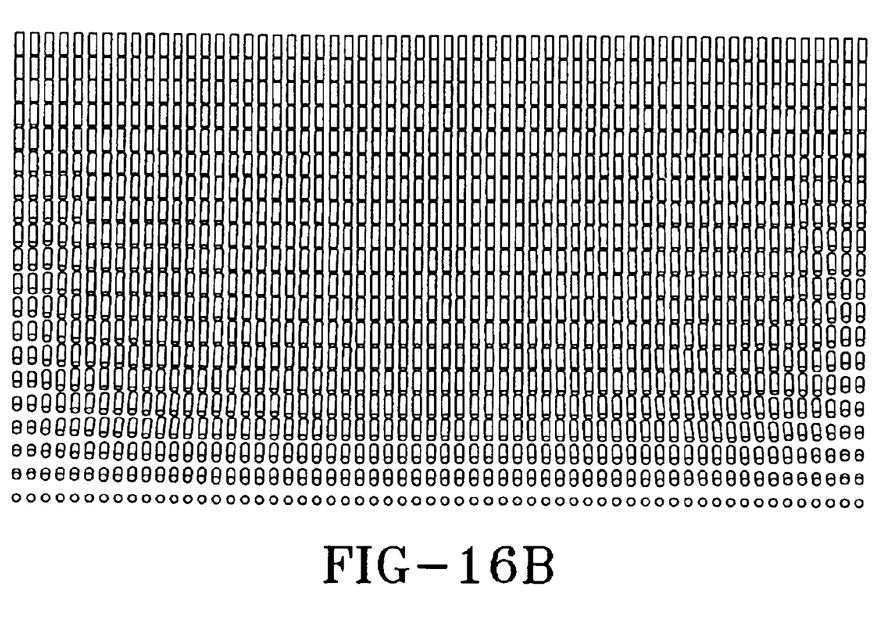
Figure 17:
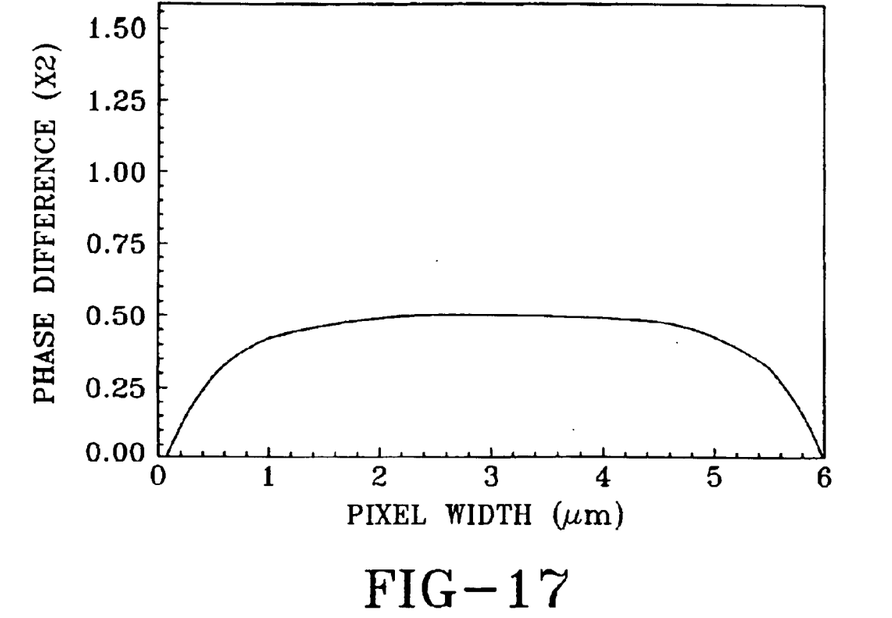
FIG. 17 is a graphical representation of a phase difference for an exemplary cell.
Figure 18:
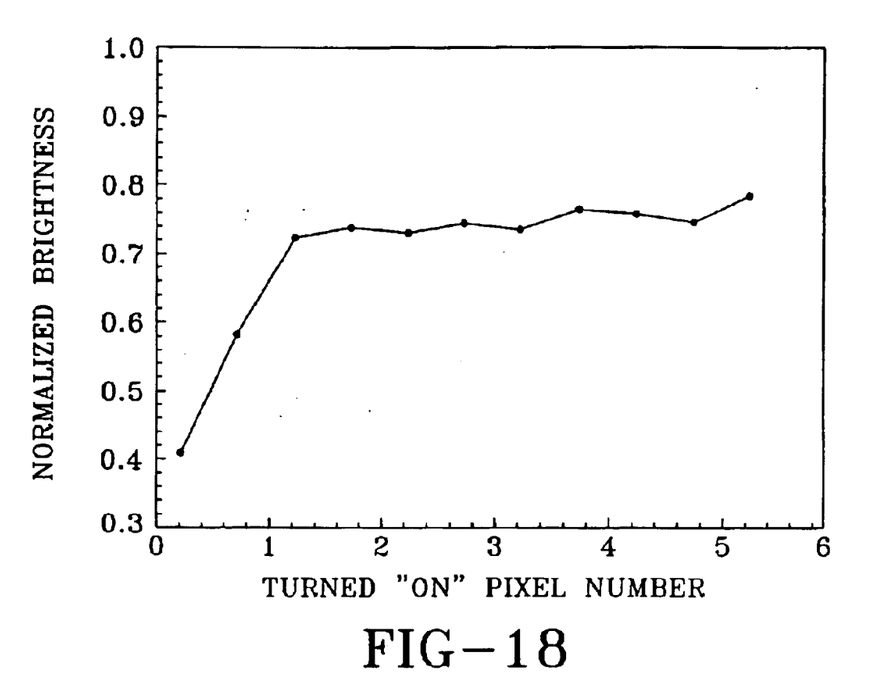
FIG. 18 is a graphical representation of turned "on" pixels as a function of normalized brightness.

As seen in FIGS. 16A and 16B, a calculated hybrid liquid crystal director field at 0 volts (FIG. 16A) and 3 volts (FIG. 16B) respectively is shown. In this example, it is assumed that the reactive liquid crystal director field in the polymer wall is "frozen" or locked in a hybrid director configuration at 0 volts. The pixel size is calculated to be 6 μm and the cell thickness is 5 μm. Accordingly, the phase profile, which corresponds to the director field at 3.0 volts is shown in FIG. 17. A phase difference between the polymer walls and liquid crystal directors in the middle of the pixel is believed to be approximately close to π. Following the same procedure as described above, the calculated normalized brightness as a function of number of turned on pixels is shown in FIG. 18 and is based upon the geometry shown in FIG. 10.

In view of the foregoing disclosure of the device 20 the advantages of the present invention are readily apparent. The two-dimensional computer simulations for the device show that this kind of device has many advantageous such as higher resolution, higher contrast ratio, a high aperture ratio and low operating voltages. Because the liquid crystal alignment comes not only from the alignment layers but also the polymer walls, a fast liquid crystal response time or switching time is expected. Moreover, the devices are believed to have beneficial uses in projection displays. And, even though the simulations results are based upon a transmissive liquid crystal mode it is believed that to be equally applicable to a reflective mode device.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby.

Accordingly, for an appreciation of the true scope and breadth of the invention, reference should be made to the following claims.

What is claimed is:

1. A liquid crystal diffractive light valve comprising:
   first and second opposed substrates, each of said substrates having an electrode layer facing each other patterned to form a plurality of pixels, wherein said first substrate imposes a liquid crystal alignment parallel to said substrates and said second substrate imposes a liquid crystal alignment that is perpendicular to said substrates; and
   a composite formed from a liquid crystal material and a reactive liquid crystal monomer material disposed between said substrates, said composite material phase separated to form crosslinked polymer walls made from said reactive liquid crystal monomer having liquid crystal directors fixed therein regardless of application of an electric field across said electrode layers, and liquid crystal regions between said polymer walls, said liquid crystal regions having liquid crystal directors which are movable when an electric field is applied across said electrode layers; wherein the director axis orientation in the polymer walls and the liquid crystal regions is not uniform and varies throughout the thickness of the light valve; and wherein the pixels are periodic in two dimensions and the liquid crystal regions periodic in one dimension and continuous in a second dimension.

2. The light valve according to claim 1, wherein said liquid crystal material and said reactive liquid crystal monomer have substantially similar extraordinary refractive indexes.

3. The light valve according to claim 1, wherein said liquid crystal directors in said polymer walls remain fixed when a field is applied, and wherein said liquid crystal directors in said pixel regions are reoriented to diffract light passing through the valve.

4. The light valve according to claim 3 wherein said substrates are transmissive and wherein application of a first voltage value causes a polarized light phase state passing through said polymer walls and said pixel regions to be substantially equal, and wherein application of a second voltage value causes said polarized phase state passing through said polymer wall to be about a half wave different than said polarized phase state passing through said pixel region, so as the light exiting the device from the polymer wall and pixel regions is of the same phase when a first voltage is applied and so as light exiting the device from the polymer wall and pixel regions is a half-wave out of phase when a second voltage is-applied.

5. The light valve according to claim 3 wherein one of said substrates is reflective and wherein application of a first voltage value causes a polarized light phase state passing through said polymer walls and said pixel regions to be substantially equal, and wherein application of a second voltage value causes said polarized phase state passing through said polymer wall to be about a quarter wave different than said polarized phase state passing through said pixel region, so as the light exiting the device from the polymer wall and pixel regions is of the same phase when a first voltage is applied and so as light exiting the device from the polymer wall and pixel regions is a half-wave out of phase when a second voltage is applied.

6. The light valve according to claim 1, wherein each pixel comprises at least a portion of at least two liquid separate crystal regions and at least two polymer walls.

7. A liquid crystal diffractive light valve, comprising:
 a silicon substrate having a reflective conductive layer patterned to form a plurality of pixels and an alignment layer disposed thereon;
 a transparent substrate facing said silicon substrate, said transparent substrate having an electrode layer disposed thereon and an alignment layer disposed on said electrode layer, wherein said respective alignment layers face one another with a gap therebetween, and wherein one alignment layer imposes a liquid crystal alignment parallel to said substrates and the other alignment layer imposes a liquid crystal alignment perpendicular thereto;
 a plurality of crosslinked polymer walls disposed between said silicon substrate and said transparent substrate in a like direction;
 a plurality of liquid crystal regions disposed between said silicon substrate and said transparent substrate, said crosslinked polymer walls and said liquid crystal regions comprising a diffraction grating;
 both said polymer walls and said liquid crystal regions containing liquid crystal directors, wherein said liquid crystal directors are fixed in alignment in said polymer walls regardless of application of an electric field across said electrode layer and said silicon substrate, wherein the director axis orientation in the polymer walls and the liquid crystal regions is not uniform and varies throughout the thickness of the light valve, and wherein said pixels are periodic in two directions and the liquid crystal regions are periodic in one direction and continuous in another direction.

8. The light valve according to claim 7, wherein said liquid crystal directors in said liquid crystal regions are re-oriented upon application of said electric field across selected portions of said silicon substrate and said electrode layer.

9. The light valve according to claim 7, wherein said polymer walls are formed from a monomer which has an index of refraction substantially similar to said liquid crystal material.

10. The light valve according to claim 7, wherein said polymer walls extend an entire length of said valve and are periodically spaced apart from one another.

11. The light valve according to claim 7, wherein application of an electric field across selected portions of said electrode layer and said silicon substrate imparts a phase difference on polarized light impinging upon said pixels with respect to the same polarized light impinging upon adjacent polymer walls.

12. The light valve according to claim 7, wherein each pixel comprises at least a portion of at least two liquid separate crystal regions and at least two polymer walls.

* * * * *